ically against its spring bias to start position after which the guide pin is reengaged with the track. The microfiche may then be replayed or be replaced by another.

United States Patent [19]
Peterpaul

[11] 3,778,141
[45] Dec. 11, 1973

[54] AUTOMATIC ADVANCE MECHANISM FOR MICROFICHE READER

[75] Inventor: Joseph Peterpaul, West Orange, N.J.

[73] Assignee: E.R.E. Laboratory, Inc., West Orange, N.J.

[22] Filed: June 22, 1972

[21] Appl. No.: 265,389

[52] U.S. Cl............ 353/15, 353/18, 353/106, 353/27
[51] Int. Cl............ G03b 23/12, G03b 31/06
[58] Field of Search............ 353/106, 25, 26, 353/27, 103, 110, 122, 15, 18; 355/53; 40/79, 106.1

[56] References Cited
UNITED STATES PATENTS
| | | | |
|---|---|---|---|
| 3,716,293 | 2/1973 | Kitano et al. | 353/27 |
| 3,352,201 | 11/1967 | Brownscombe | 353/27 |
| 3,507,571 | 4/1970 | White | 353/15 |

FOREIGN PATENTS OR APPLICATIONS
| | | | |
|---|---|---|---|
| 371,686 | 10/1963 | Switzerland | 353/15 |

Primary Examiner—Harry N. Haroian
Attorney—George H. Fritzinger

[57] ABSTRACT

A microfiche reader keyed to a tape recorder includes a platen receiving a microfiche having a series of images or frames arranged in successive parallel rows and columns. The platen is mounted slidably on a carriage for movement laterally of the reader in the direction of a row or X axis of the microfiche and the carriage is in turn mounted slidably on a chassis for movement front-to-back in the direction of a column or X axis of the microfiche. The platen and carriage are each spring-biased in one direction of their travel into end positions placing one of the images in the beam of a light source. A track in a face of the platen of a grid formation has parallel track sections for the respective columns interconnected at the ends. A guide pin on the chassis engages this track and a pawl-rack mechanism is operable to step the carriage against the force of its return spring by successive images. When the guide pin has reached the end of a track section the pawl is disengaged and the carriage is spring returned and the platen spring shifted sidewise to place the first image of the next column into the light beam, and so on until all images have been scanned. When the end of the microfiche is reached the guide pin is disengaged causing the carriage to be spring returned home and the platen is shifted manu-

11 Claims, 5 Drawing Figures

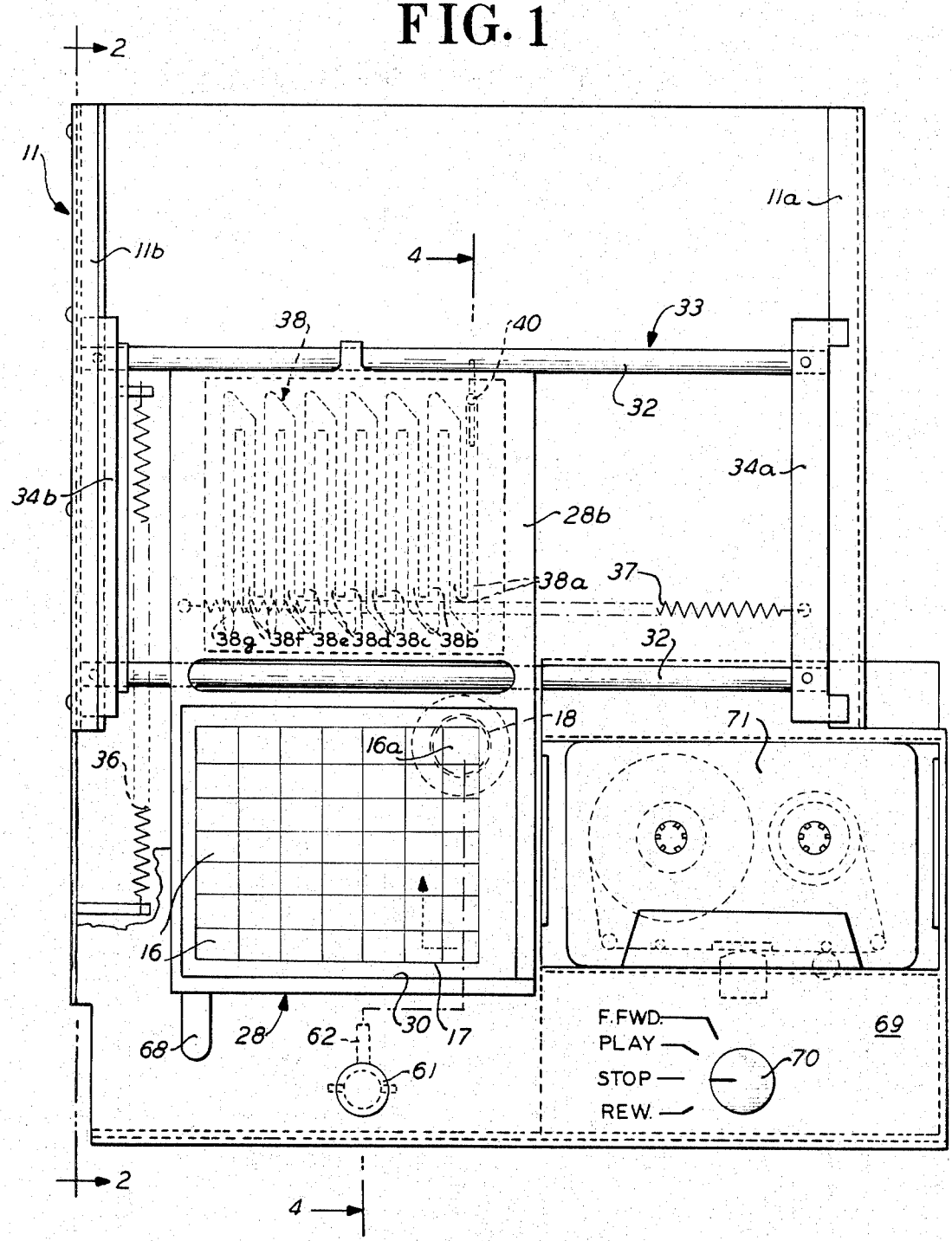

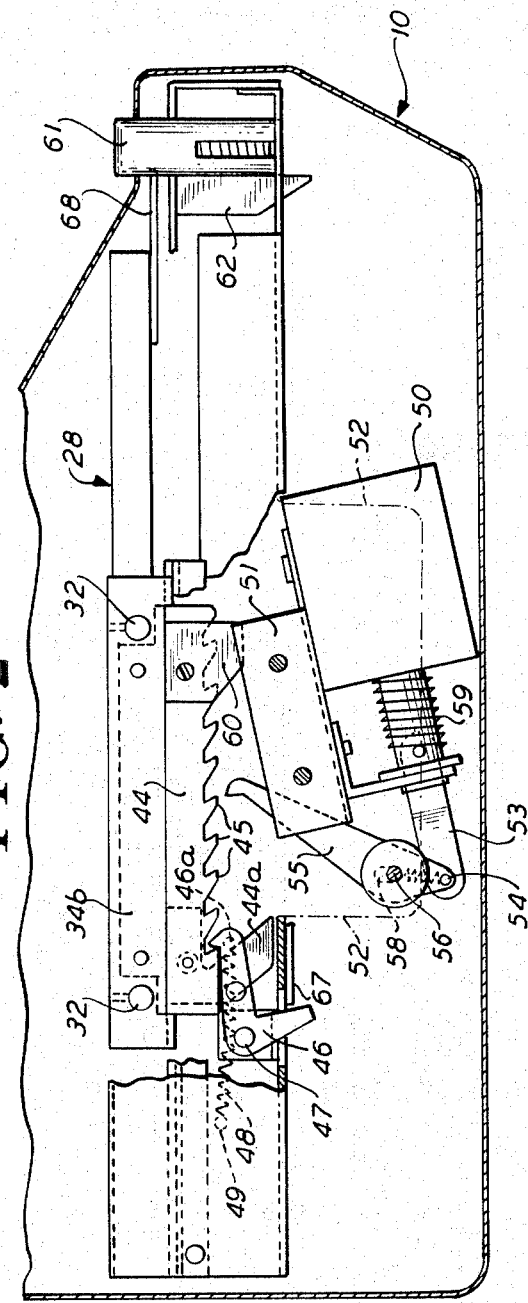

AUTOMATIC ADVANCE MECHANISM FOR MICROFICHE READER

An object of the invention is to provide an improved and simplified mechanism operable by successively actuating a single solenoid to step a microfiche along a predetermined path placing the images successively in a light beam for projection onto a reading screen.

Another object is to provide such system wherein the successive frames of a first column of the microfiche are scanned, the microfiche is then shifted by successive half column incre-ments at the beginning and end loops of a return track to its starting row thus placing the first image of the second column in the light beam whereby the columns are scanned successively each starting from a first row of images of the microfiche.

Another object is to provide an automatic advance mechanism for a microfiche which is simple, dependable and economical to produce.

These and other objects and features of the invention will be apparent from the following description and the appended claims.

In the description of my invention, reference is had to the accompanying drawings, of which:

FIG. 1 is a top plan view of the lower rectangular portion of the chassis and of the apparatus mounted thereon for a microfiche reader according to the invention;

FIG. 2 is a left side elevational view partly broken away of this lower portion of the reader taken on the line 2—2 of FIG. 1;

FIG. 3 is a rear elevational view of this lower portion of the reader;

Figure 4:
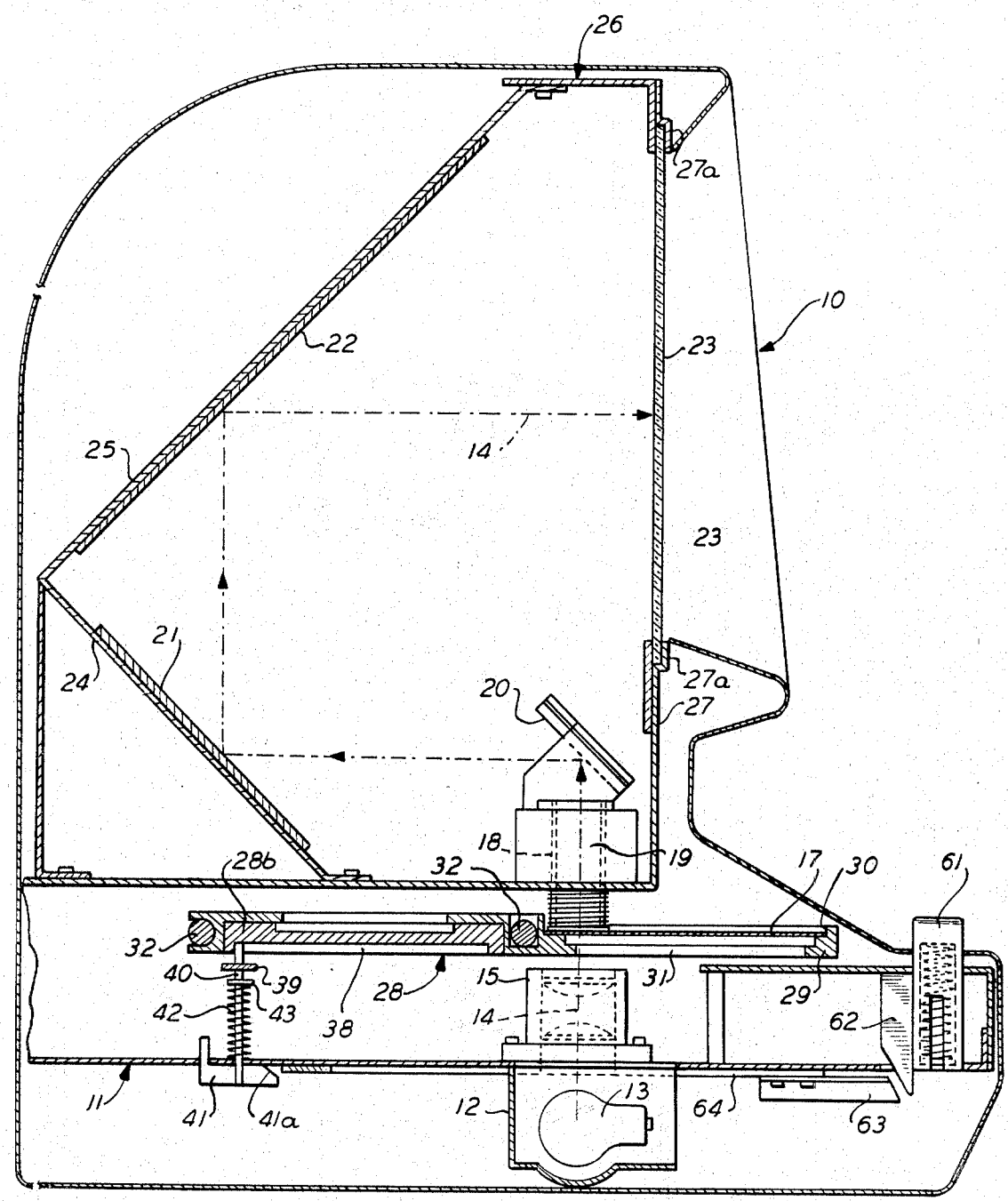
FIG. 4 is a vertical section taken on the line 4—4 of FIG. 1.

The present microfiche reader has a cabinet 10 molded of plastic which in profile outline appears as indicated in FIG. 4. Mounted in the lower part of this cabinet is a chassis 11 of generally rectangular form as shown in FIG. 1. Mounted on the underside of the chassis 11 is a lamp box 12 having an incandescent light bulb 13 therein (FIG. 4). The light beam 14 from this bulb passes through a columnar lens 15, one or another of the frames or images 16 (FIG. 1) of a microfiche 17, and a tube 18 having a focusing lens 19 therein. From the lens 19 the beam is reflected from an oblique mirror 20 onto a first oblique back mirror 21, and then from a second oblique back mirror 22 into a forward direction onto a viewing screen 23. The two oblique back mirrors 21 and 22 are mounted on right angle back walls 24 and 25 of an upper frame structure 26 carried by the chassis. This frame structure 26 has a front wall 27 with a window frame 27a supporting the viewing screen 23.

The present invention relates to a mechanism for automatically advancing the microfiche 17 along right angle X and Y axes to locate the images selectively in the path of the light beam 14. This mechanism — which is mounted entirely on the lower rectangular chassis 11 — comprises a horizontal platen 28 the forward half portion of which is in the form of a tray 29 having a rabbeted edge 30 receiving the microfiche film and having a bottom wall 31 apertured for exposure of the respective images 16 to the light beam 14. The back half portion 28b of the platen is mounted slidably on two parallel transverse support rods 32 of a carriage 33. The carriage comprises simply the two rods 32 and a pair of slides 34a and 34b secured to the ends of the rods. The outer end face of the slide 34a engages an inwardly turned flange 11a of the chassis (FIGS. 1 and 3) and the slide 34b is captured between a turned over flange 11b of the chassis and a bracket 35 welded to the side of the chassis and engaging a guide slot in the bottom of the slide (FIG. 3). A tension spring 36 between the chassis 11 and carriage 33 biases the carriage forwardly and a tension spring 37 between the platen 28 and carriage 33 biases the platen to the right as seen in FIG. 1. When the platen 28 and carriage 33 are respectively in their leftward and forward end positions the image 16a of the first row and of the rightmost column of the microfiche is in the light beam 14 as shown in FIG. 1.

In the underside of the back half portion 28b of the platen 28 there is a continuous groove or track 38 of a grid formation comprising respective pairs of parallel track sections 38a–38g, looped back on themselves, for the seven columns of images in the microfiche 17. Each track section is longer than the respective column by approximately the length of a frame or image, and the successive pairs of looped track sections are spaced in accordance with the spacing of the successive columns.

Extending slidably upwardly through the bottom wall of the chassis 11 and through a bracket 39 riveted to the chassis is a guide pin 40 (FIG. 3) the upper end portion of which engages the track 38 responsive to a compression spring 42 between the chassis and a retainer ring 43 on the pin. When the carriage 33 is in its forward biased position and the platen 28 is latched in its rightmost position by engagement of the guide pin 40 with the track 38 the guide pin 40 engages the track at its starting position.

Secured to the underside of the slide 34b of the carriage 33 is a rack 44 (FIG. 2) having successive teeth 45 spaced by the distance between successive frames 16 in the respective columns. Engaging the left end portion of this rack is a latch pawl 46 pivoted to the chassis 11 at 47 and biased over center in toggle fashion by a tension spring 48 connected between a side lug 46a on the pawl (FIG. 3) and a stud 49 on the chassis 11. Also, below the rack 44 is a solenoid 50 mounted via a bracket 51 on a deep flange 52 depending from the chassis (FIGS. 2 and 3). This solenoid has a plunger 53 pivotally connected at 54 to one end of an actuator pawl 55 of a bell crank shape. A pivot shaft 56 for the actuator pawl is secured to the flange 52 via a space block 57 and passes through a slot 58 in the pawl to allow a free pivoting of the pawl responsive to the rectilinear movement of the plunger 53. The plunger is biased outwardly into an unoperated position by a compression spring 59 to hold the actuator pawl normally in its unoperated position.

Each actuation of the solenoid 50 steps the carriage 33 backwardly to shift the microfiche from one image to the next whereat the carriage becomes latched by the pawl 46. When the end of a column is reached, say the first column, the next actuation of the pawl 55 shifts the first track section of the pair 38a beyond the guide pin 40 and simultaneously it shifts the latch pawl 46 against a cam face 60 on the rack 44 (FIG. 2) to cam the latch pawl over center into disengaged position. The platen 28 is now freed so that the spring 37 will shift the platen to the right by one-half the distance between successive columns placing the guide pin 40 in the second of the pair 38a of parallel track sections associated with the first column. Upon deenergization of the solenoid 50 the pawl 55 is released and the platen is snapped forwardly by the spring 36. As the forward position is reached, the guide pin 40 is moved past the second track section of the pair 38a, enabling the spring 37 to shift the platen sidewise by another half distance between successive columns, and the latch pawl is shifted over center into engaged position by a cam finger 44a depending from the rack 44. The guide pin 40 is now at a start position of the first track section of the second pair 38b and the first image of the second column of the microfiche is now in the light beam 14. As the solenoid 50 is successively actuated the above cycle of operations is repeated causing the successive images in the second column to be brought into the light beam and then the microfiche to be shifted to place the first image of the third column in the light beam, etc., until the last image of the microfiche is scanned. Upon next actuating the solenoid 50 the latch pawl 46 is shifted over center into released position by the cam 60 and upon deactivation of the solenoid the platen 28 is snapped forwardly placing the first picture of the last column again in the light beam 14. This signals the user to have the microfiche replaced.

Figure 5:
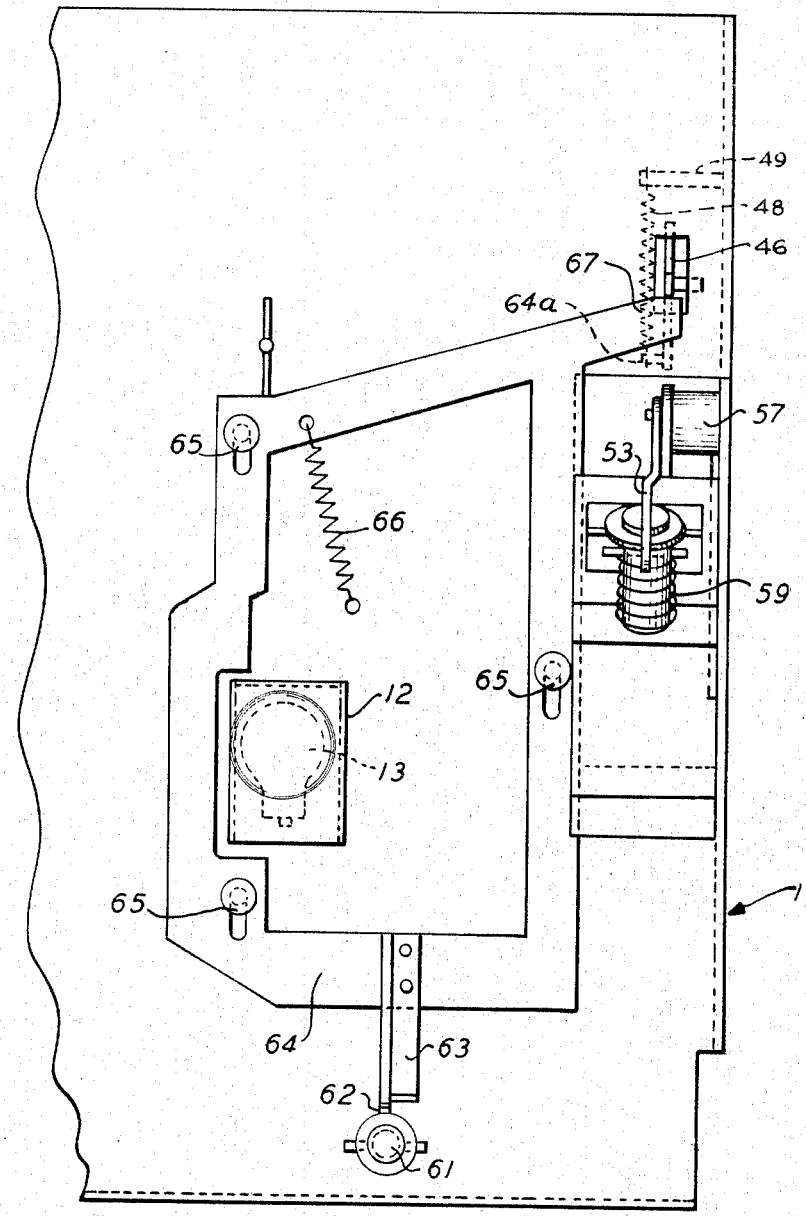
FIG. 5 is a fractional bottom view of the chassis.

The user presses a release buttom 61 at the front of the platen 28 (FIGS. 1 and 4). As the button is depressed, a cam 62 on the side thereof moves against a cam follower 63 on a slide plate 64, mounted slidably by pin and slot connections 65 on the bottom of the chassis 11, to move the plate 64 rearwardly against the force of a return spring 66 (FIG. 5). As the slide plate 64 is so moved it engages a cam face 41a (FIG. 4) of a cam plate 41 welded to the guide pin 40 to cam the guide pin downwardly out of engagement with the track 38, and an arm 67 of the slide plate 64 moves against the latch pawl 46 to unlatch the platen 28. Thus the carriage 33 with the platen 28 is snapped forwardly placing the first row of images of the platen in transverse alignment with the light beam 14 and causing the latch pawl 46 to be shifted over center by the cam finger 44a back into engaged position. While the user is still holding the button 61 depressed he takes hold of a handle 68 projecting forwardly from the platen 28 and shifts the platen to the left against the return force of the spring 37. When the first column of images of the microfiche reaches the light beam 14 the user releases the button 61 to cause the cam plate 64 to be shifted forwardly by spring 66 to release the guide pin 40 into engagement with the first track section 38a in the platen 28. The reader is now restored for operation and a new microfiche is installed or the old one replayed.

Mounted in the front right portion of the microfiche reader is a cassette-type tape recorder 69 of the usual construction controlled by a knob 70 shiftable between rewind, stop, play and fast-forward positions. The cassette 71 of this tape recorder is recorded with audio material relating to the respective images of the microfiche and with a control signal after each individual recording. By proper ampification this control signal is raised to a power lever sufficient to actuate the solenoid 50 whereby to step the microfiche ahead to bring the next image in line with the light beam 14 as soon as the recording related to the previous image is completed.

The description of my invention is herein intended to be illustrative and not necessarily limitative of my invention since the same is subject to changes and modifications without departure from the scope of my invention, which I endeavor to express according to the following claims:

I claim:

1. In automatic advance mechanism for a microfiche reader having picture frames equally spaced along successive rows and columns: the combination of a carriage mounted for movement along a first axis, a platen mounted on said carriage for movement relative thereto along a second axis at right angles to said first axis, a fixed light-beam source, a portion of said platen being adapted for receiving a microfiche and for permitting passage of said light beam through the respective picture frames thereof depending on the right angle positioning of said platen, a grid-type track formation in the face of a second portion of said platen comprising a pair of parallel groove sections looped back on themselves along one of said axes for each row or column of picture frames of said microfiche with the last portion of each pair being joined to the first portion of the next succeeding pair, and a guide pin engaging said track formation to guide said platen back and forth along said successive groove sections whereby successive columns of said picture frames are scanned by said light beam source as the first sections of said successive pairs are traversed by said guide pin.

2. The automatic advance mechanism set forth in claim 1 including spring means biasing said carriage home along a first axis and biasing said platen in an advance direction along said second axis, a pawl and rack mechanism successively actuatable for stepping said carriage along said first axis against the return force of said biasing means with said biasing means being operable to shift said platen sidewise along said second axis to the next groove section of each pair when the end of the first groove section is reached.

3. The automatic advance mechanism set forth in claim 2 including a latch pawl for detenting said platen in each step position thereof, and means for releasing said latch pawl to permit return of said platen along the second of each pair of groove sections by said spring means when said guide pin has reached the end of the first groove section of each pair.

4. The automatic advance mechanism set forth in claim 3 wherein said latch pawl is biased over center between engaged and disengaged positions, including means for camming the latch pawl into disengaged position when said guide pin reaches the end of the first groove section of each pair and for camming the latch pawl back into engaged position when the guide pin reaches the end of the second groove section of each pair.

5. The automatic advance mechanism set forth in claim 3 wherein said guide pin is mounted for movement into and out of engagement with said groove formation, including means biasing said guide pin into engaged position.

6. The automatic advance mechanism set forth in claim 5 including manually operable cam means for disengaging said guide pin from said groove formation.

7. The automatic advance mechanism set forth in claim 6 including means for shifting said latch pawl into disengaged position simultaneously as said guide pin is disengaged.

8. The automatic advance mechanism set forth in claim 7 including a push button depressible for camming said guide pin free of said track formation and for simultaneously shifting said latch pawl into disengaged position, and means for shifting said platen relative to said carriage while said push button is held depressed.

9. The automatic advance mechanism set forth in claim 1, including a first spring means biasing said carriage to home position, a second spring means biasing said platen relative to said carriage in an advance direction, a pawl and ratchet mechanism for stepping said carriage ahead against the force of said return spring, a latch pawl for detenting said carriage in each stepped position thereof, means for camming said latch pawl to disengaged position simultaneously as said plate is shiftd sidewise at the end of the first groove section of each pair whereby said carriage is thereupon returned home with said pin traversing the second section of each pair, and a cam portion at the end of the second section of each pair for camming said platen sidewise to bring the first frame of the next column in line with said light source when said carriage reaches home.

10. The automatic advance mechanism set forth in claim 9, including manual means operable to disengage said latch pawl and said pin from said track formation for causing said carriage to be returned home by said first spring means and for enabling said platen to be shifted manually against said second spring means to start position before said manual means is released to latch said pin again with said track formation.

11. The automatic advance mechanism as set forth in claim 2 wherein said microfiche reader includes, a solenoid for successively actuating said pawl and rack mechanism, a recorder having a record medium with separate successive recordings keyed to the successive picture frames of said microfiche, wherein said record medium has a control signal recorded thereon at the end of each of said recordings for momentarily activating said solenoid to step said microfiche ahead by one picture frame at the end of each of said recordings.

* * * * *